(12) United States Patent
Grill et al.

(10) Patent No.: US 7,962,768 B2
(45) **Date of Patent: *Jun. 14, 2011**

(54) MACHINE SYSTEM HAVING TASK-ADJUSTED ECONOMY MODES

(75) Inventors: Thomas Lynn Grill, Marseilles, IL (US); Rick William Berlage, Dekalb, IL (US); Lucas Adam Knapp, Naperville, IL (US); Eric Wade Cler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 808 days.

This patent is subject to a terminal disclaimer.

(21) Appl. No.: 11/711,760

(22) Filed: Feb. 28, 2007

(65) Prior Publication Data

US 2008/0202468 A1 Aug. 28, 2008

(51) Int. Cl.
*G06F 1/00* (2006.01)
*F16D 31/02* (2006.01)

(52) U.S. Cl. ............... 713/300; 701/50; 701/54; 701/56

(58) Field of Classification Search .................. 713/300; 701/50, 54, 56

See application file for complete search history.

(56) References Cited

U.S. PATENT DOCUMENTS 4,475,380 A 10/1984 Colovas et al.
4,697,418 A 10/1987 Okabe et al.
4,726,186 A * 2/1988 Tatsumi et al. ................. 60/434
4,904,161 A 2/1990 Kamide et al.
4,955,344 A 9/1990 Tatsumi et al.
5,077,973 A 1/1992 Suzuki et al.
5,214,916 A * 6/1993 Lukich ............................ 60/431
5,406,483 A * 4/1995 Kallis et al. ..................... 701/53
5,469,646 A 11/1995 Takamura
5,477,679 A 12/1995 Tatsumi et al.
5,481,875 A 1/1996 Takamura et al.
5,586,536 A 12/1996 Seo et al.
5,630,317 A 5/1997 Takamura et al.
5,682,855 A 11/1997 Lee et al.
5,954,617 A 9/1999 Horgan et al.
5,983,156 A 11/1999 Andrews
6,042,505 A 3/2000 Bellinger
6,161,522 A 12/2000 Fuchita et al.
6,182,448 B1 2/2001 Ohkura et al.
6,234,254 B1 5/2001 Dietz et al.

(Continued)

FOREIGN PATENT DOCUMENTS

EP 0612916 A2 8/1994

(Continued)

OTHER PUBLICATIONS

U.S. Appl. No. 11/882,234, filed Feb. 2009, Lin et al.*

(Continued)

*Primary Examiner* — Vincent T Tran
(74) *Attorney, Agent, or Firm* — Finnegan, Henderson, Farabow, Garrett & Dunner LLP

(57) ABSTRACT

A control system for a machine is disclosed. The control system may have a power source, an operator input device, a work implement, and a controller in communication with the power source and the operator input device. The operator input device may be configured to generate a signal indicative of a desired mode of power source operation. The work implement may be driven by the power source to accomplish a task. The controller may be configured to classify a currently performed task, and adjust power source operation based on the task signal and the classification.

17 Claims, 3 Drawing Sheets

U.S. PATENT DOCUMENTS

| | | | | |
|---|---|---|---|---|
| 6,336,067 | B1 | 1/2002 | Watanabe et al. | |
| 6,371,885 | B1 | 4/2002 | Kobayashi et al. | |
| 6,387,011 | B1 | 5/2002 | Bellinger | |
| 6,436,005 | B1 | 8/2002 | Bellinger | |
| 6,496,767 | B1 | 12/2002 | Lorentz | |
| 6,546,329 | B2 | 4/2003 | Bellinger | |
| 6,819,996 | B2 | 11/2004 | Graves et al. | |
| 6,823,672 | B2 | 11/2004 | Nakamura | |
| 6,944,532 | B2 | 9/2005 | Bellinger | |
| 6,959,241 | B2 | 10/2005 | Itow et al. | |
| 7,584,611 | B2 * | 9/2009 | Ariga et al. | 60/431 |
| 2002/0017189 | A1 | 2/2002 | Nishimura et al. | |
| 2002/0073699 | A1 * | 6/2002 | Nishimura et al. | 60/325 |
| 2002/0132699 | A1 | 9/2002 | Bellinger | |
| 2004/0002806 | A1 | 1/2004 | Bellinger | |
| 2004/0088103 | A1 | 5/2004 | Itow et al. | |
| 2004/0128047 | A1 | 7/2004 | Graves et al. | |
| 2004/0148084 | A1 | 7/2004 | Minami | |
| 2005/0149245 | A1 * | 7/2005 | Kilworth et al. | 701/54 |
| 2006/0155453 | A1 * | 7/2006 | Han et al. | 701/54 |
| 2006/0182636 | A1 | 8/2006 | Ivantysynova et al. | |
| 2006/0235595 | A1 | 10/2006 | Sawada | |
| 2007/0016355 | A1 | 1/2007 | Kamado et al. | |
| 2007/0101708 | A1 | 5/2007 | Ohigashi et al. | |
| 2008/0006027 | A1 * | 1/2008 | Ozawa et al. | 60/429 |
| 2008/0072588 | A1 * | 3/2008 | Ariga et al. | 60/449 |
| 2008/0319618 | A1 * | 12/2008 | Sjogren et al. | 701/50 |
| 2009/0037072 | A1 | 2/2009 | Lin et al. | |
| 2009/0240406 | A1 * | 9/2009 | Fukushima et al. | 701/54 |

FOREIGN PATENT DOCUMENTS

| | | | |
|---|---|---|---|
| EP | 0532756 | B1 | 10/1996 |
| EP | 0 795 651 | A1 | 9/1997 |
| EP | 0667451 | B1 | 9/1997 |
| EP | 0795651 | | 9/1997 |
| EP | 0795651 | B1 | 5/2002 |
| EP | 1 666 711 | A1 | 6/2006 |
| EP | 1666711 | | 6/2007 |
| EP | 1 803 914 | A1 | 7/2007 |
| EP | 1803914 | | 7/2007 |
| JP | 62 160334 | | 7/1987 |
| JP | 07119506 | | 5/1995 |
| WO | WO 98/06936 | | 2/1998 |
| WO | WO 2008/106154 | A1 | 9/2008 |
| WO | WO 2008106154 | | 9/2008 |

OTHER PUBLICATIONS http://www.transportandconstruction.co.za/articles/article6.html, 5 pages, printed on Oct. 13, 2005.

http://www.komatsuamerica.com/index.cfm?resource_id=218, 3 pages, printed on Oct. 14, 2005.

Hitachi Construction and Mining Products Brochure, 1 page, printed on Oct. 14, 2005.

Komatsu WA600-6 Wheel Loader Product Brochure, 12 pages, Feb. 2006.

WA600-6 Wheel Loader Document, pp. 18-25, Sep. 23, 2005.

Outstanding Fuel Efficiency Document, 1 page.

U.S. Appl. No. 11/882,234, filed Jul. 31, 2007, "Machine with Task-Dependent Control," pp. 1-17, Figs. 1-6.

Office Action for U.S. Appl. No. 11/882,234 mailed on Apr. 30, 2010 (5 pages).

Office Action for U.S. Appl. No. 11/882,234 mailed on Oct. 13, 2010 (6 pages).

* cited by examiner

MACHINE SYSTEM HAVING TASK-ADJUSTED ECONOMY MODES

TECHNICAL FIELD

The present disclosure relates generally to a machine system and, more particularly, to a machine system having task-adjusted economy modes of operation.

BACKGROUND

Mobile machines, including wheel loaders, bulldozers, motor graders, and other types of heavy equipment, are used for a variety of tasks. In order to accomplish these tasks, the machines typically include a primary mover, such as an internal combustion engine that is coupled to traction devices of the machine to propel the machine. The primary mover can also be coupled to power a work implement attached to the machine.

One type of machine is known as a "high-idle" machine. During operation of a high-idle machine, an output of the primary mover is generally set to a level sufficient to quickly produce the maximum power that could be required by the traction devices and the work implement. That is, in order to ensure that the machine has power sufficient to move the machine and work implement under all conditions, the primary mover is set to a maximum output level (i.e., speed, torque, or a combination of speed and torque), even if the current task being accomplished by the machine demands less output from the primary mover. This high output level may be inefficient and result in unnecessary high fuel consumption, machine harshness, excessive exhaust emissions, and high levels of engine noise.

One way to reduce the unnecessary fuel consumption, excessive exhaust emissions, and noise associated with a high-idle machine is disclosed in U.S. Pat. No. 4,955,344 (the '344 patent) issued to Tatsumi et al. on Sep. 11, 1990. The '344 patent discloses a construction machine having an engine and a hydraulic pump utilized to power an actuator. In one embodiment, the machine includes three modes of operation: a power mode, an economy mode, and a light mode. In the power mode, corresponding to a range of operation for high-load traveling or heavy excavation, a maximum displacement of the pump is set to a smaller value and the engine is operated in a high rotational speed range. In the economy mode, corresponding to a range of operation for small-load traveling or light excavation, the maximum displacement of the pump is set to a larger value and the maximum rotational speed of the engine is limited to a speed lower than the rotational speed in the power mode. In the light mode, corresponding to a range in which the engine needs to be finely controlled, the maximum displacement of the hydraulic pump is set to the same value as in the economy mode, but the engine speed is limited to a much lower speed. This selection of the maximum displacement of the pump and the engine speed enables the construction machine to be operated by selecting the optimum engine speed and the optimum pump absorption horsepower, thereby reducing the fuel consumption rate, as well as limiting engine noise.

Although the construction machine of the '344 patent may improve fuel efficiency, emissions, and noise by offering economy and light modes of operation, it may still be suboptimal. In particular, even within the economy or light modes of operation, the machine may still be used to accomplish tasks that require less than the maximum engine output provided by that selected mode. For example, when operating in the economy mode, an unloading task requires less output from the engine than a digging task. Although the maximum available output from the engine when operating in the economy mode is less than the maximum available output from the engine when operating in the power mode, the unloading task may still require far less from the engine than is available in the economy mode. This excess available output can result in unnecessary fuel consumption, exhaust emissions, and noise. And, if the economy mode is dropped low enough such that the fuel consumption, exhaust emissions, and noise are substantially unaffected by the available output in that mode, the available output may be insufficient for some high power tasks slated for the construction machine.

The disclosed machine system is directed to overcoming one or more of the problems set forth above.

SUMMARY OF THE INVENTION

In one aspect, the present disclosure is directed to a machine control system. The control system may include a power source, an operator input device, a work implement, and a controller in communication with the power source and the operator input device. The operator input device may be configured to generate a signal indicative of a desired mode of power source operation. The work implement may be driven by the power source to accomplish a task. The controller may be configured to classify a currently performed task, and adjust power source operation based on the operator input device signal and the classification.

In another aspect, the present disclosure is directed to a method of operating a machine. The method may include generating a power output, and directing the power output to perform a task. The method may also include receiving an input indicative of a desired mode of power output generation, classifying a currently performed task, and adjusting power generation based on the input and the classification.

DETAILED DESCRIPTION

Figure 1:
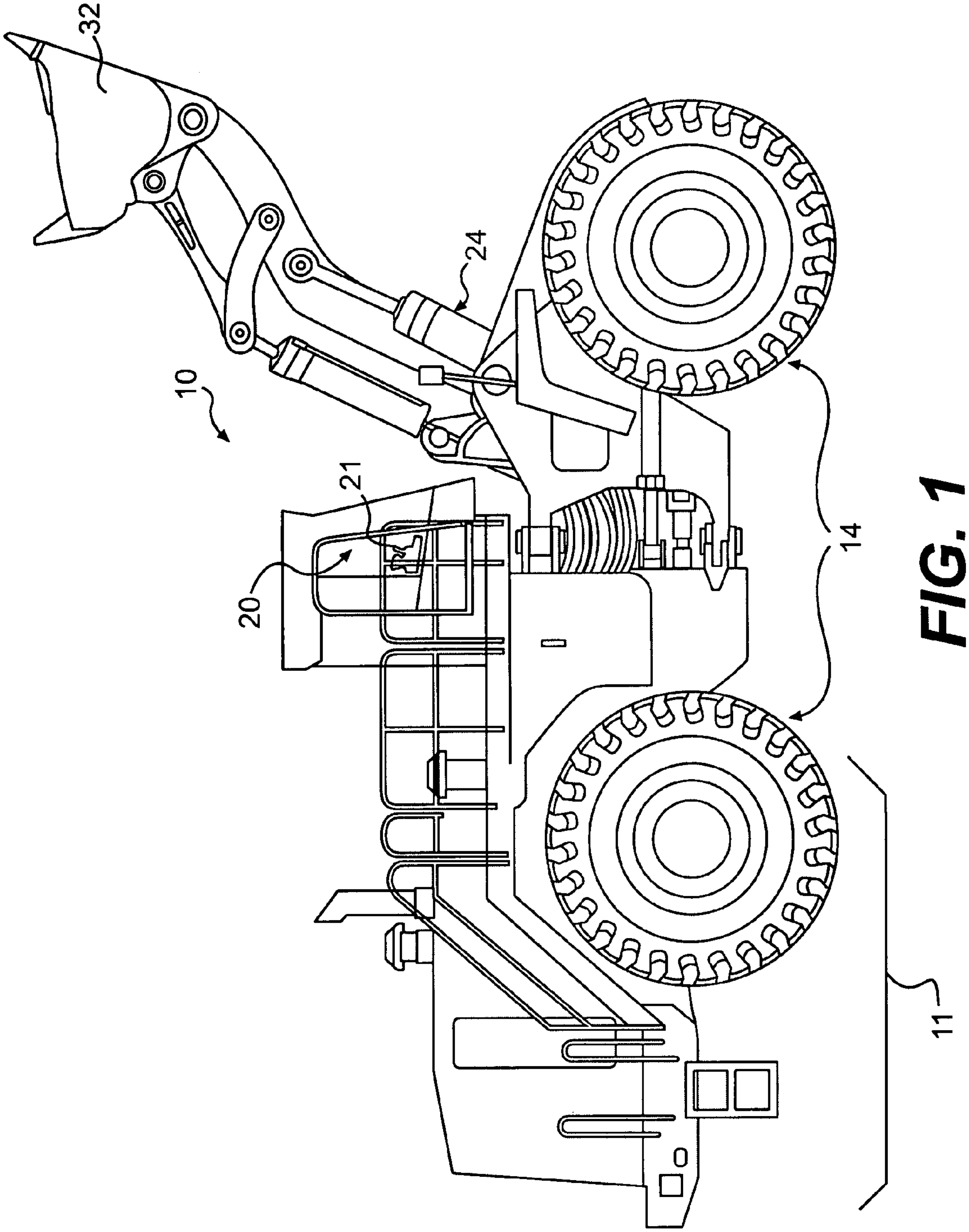
FIG. 1 is a diagrammatic illustration of an exemplary disclosed machine.
Figure 2:
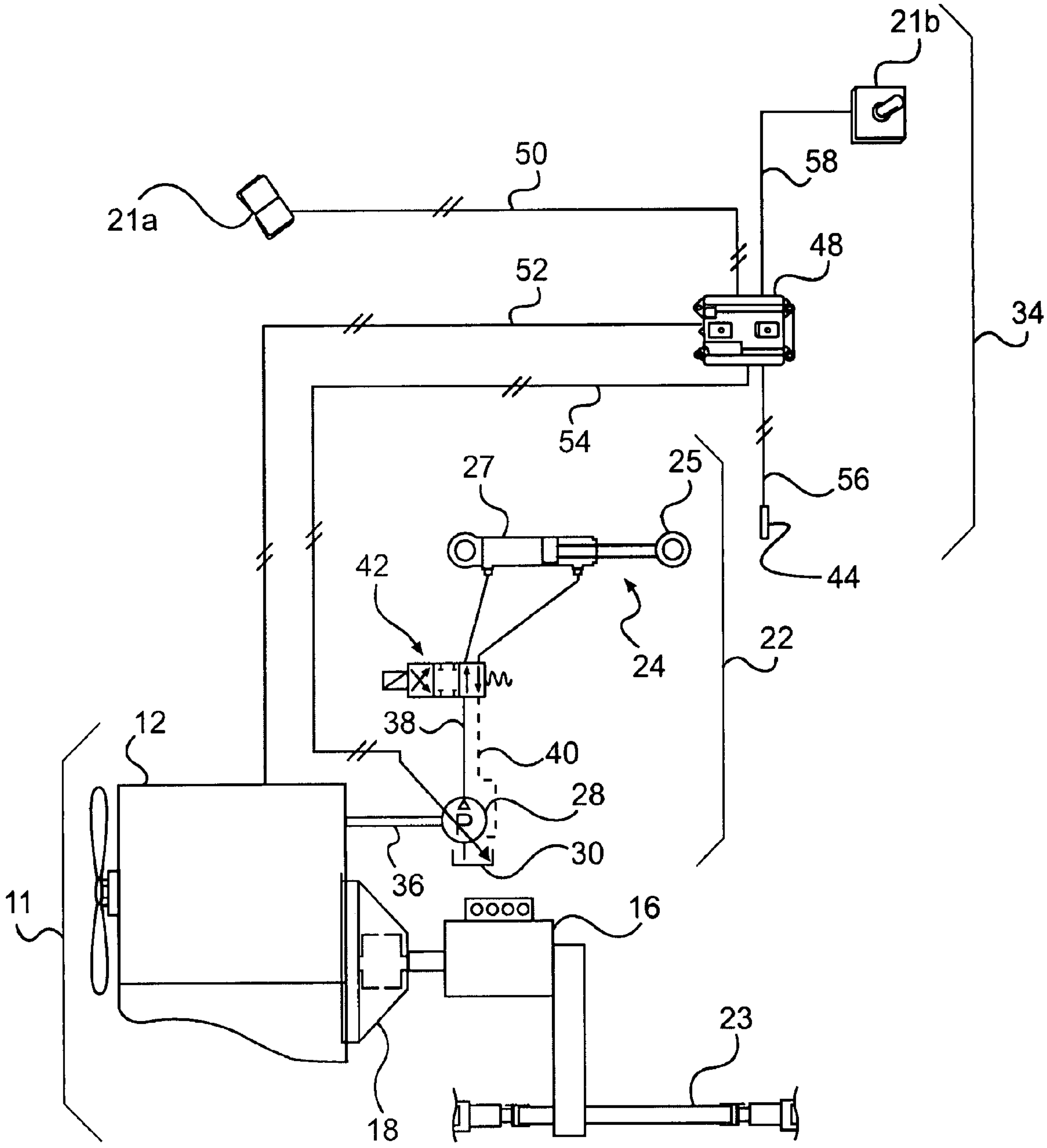
FIG. 2 is a schematic and diagrammatic illustration of an exemplary disclosed control system for use with the machine of FIG. 1.

FIG. 1 illustrates an exemplary embodiment of a machine 10. Machine 10 may be a mobile machine that performs some type of operation associated with an industry, such as mining, construction, farming, or any other industry known in the art. For example, machine 10 may be an earth moving machine, such as a wheel loader, an excavator, a backhoe, a motor grader, or any other suitable operation-performing machine. Machine 10 may include a powertrain 11, at least one traction device 14, a work implement 32, and an operator station 20, As shown in FIG. 2, powertrain 11 may include a power source 12, a torque converter 18, and a transmission 16. These components may work together to propel machine 10. Powertrain 11, or one or more of its components, may also be used to provide power to operate work implement 32.

Power source 12 may embody an engine, such as a diesel engine, a gasoline engine, a gaseous fuel powered engine (e.g., a natural gas engine), or any other type of combustion engine apparent to one skilled in the art. Power source 12 may alternatively embody a non-combustion source of power, such as a fuel cell, a power storage device, an electric motor, or other similar mechanism. Power source 12 may be connected to drive traction device 14, thereby propelling machine 10.

Transmission 16 may transmit power from power source 12 to traction device 14. In particular, transmission 16 may embody a multi-speed, bidirectional, mechanical transmission having a neutral gear ratio, a plurality of forward gear ratios, one or more reverse gear ratios, and one or more clutches (not shown). Transmission 16 may selectively actuate the clutches to engage predetermined combinations of gears (not shown) that produce a desired output gear ratio. Transmission 16 may be an automatic-type transmission, wherein shifting is based on a power source speed, a maximum operator selected gear ratio, and a shift map stored within a controller. Alternatively, the transmission 16 may be a manual transmission, wherein the operator manually selects the gear that is engaged. Transmission 16 may be connected to power source 12 by way of torque converter 18. The output of transmission 16 may be connected to rotatably drive traction device 14 via shaft 23, thereby propelling machine 10.

Traction device 14 may convert the rotational motion provided by transmission 16 to the translational motion of machine 10. Traction device 14 may include wheels located on each side of machine 10. Alternately, traction device 14 may include tracks, belts, or other driven traction devices. Traction device 14 may be driven by transmission 16 to rotate in accordance with an output rotation of transmission 16.

Numerous different work implements 32 may be attachable to a single machine 10 and controllable via operator station 20. Work implement 32 may include any device used to perform a particular task, such as a bucket, a blade, a shovel, a ripper, or any other task-performing device known in the art. Work implement 32 may be connected to machine 10 via a direct pivot, via a linkage system, via one or more hydraulic cylinders, via a motor, or in any other appropriate manner. Work implement 32 may pivot, rotate, slide, swing, lift, or move relative to machine 10 in any way known in the art.

Hydraulic system 22, may have a plurality of components that cooperate together to actuate work implement 32. Specifically, hydraulic system 22 may include one or more hydraulic cylinders 24, a pump 28 of pressurized fluid, a tank 30, and a control valve 42. Fluid may be drawn from tank 30 by pump 28 to be pressurized. Once pressurized, the fluid flow may be metered by control valve 42 and supplied to hydraulic cylinder 24 or other components of machine 10 to perform useful work. Low pressure fluid may be returned to tank 30 to allow further use by pump 28. It is contemplated that hydraulic system 22 may include additional or different components than those illustrated in FIG. 2 and listed above, such as accumulators, check valves, pressure relief or makeup valves, pressure compensating elements, restrictive orifices, and other hydraulic components known in the art.

Hydraulic cylinder 24 may be used to provide an actuating force for various components of machine 10, such as work implement 32. Work implement 32 may be connected to the frame of machine 10 via a direct pivot or via a linkage system, with hydraulic cylinder 24 forming one of the members in the linkage system. As hydraulic cylinder 24 extends or retracts, the linkage may be configured in such a way as to allow work implement 32 to translate or rotate, thus enabling the operator to perform a desired operation. Several hydraulic cylinders 24 may be used in a linkage system to create additional degrees of freedom in the movement of work implement 32.

The extension and retraction of hydraulic cylinder 24 may be effected by creating an imbalance of force on a piston assembly 25 disposed within a tube 27 of each hydraulic cylinder 24. Specifically, each hydraulic cylinder 24 may include a first chamber and a second chamber separated by piston assembly 25. Piston assembly 25 may include two opposing hydraulic surfaces, one associated with each of the first and second chambers. The first and second chambers may be selectively supplied with a pressurized fluid and drained of the pressurized fluid to create an imbalance of force on the two surfaces. This imbalance of force may cause piston assembly 25 to axially displace within the tube.

Pump 28 may produce a flow of pressurized fluid for use in machine 10. Pump 28 may embody a variable displacement pump, a fixed displacement pump, a variable flow pump, or any other source of pressurized fluid known in the art. Pump 28 may be drivably connected to power source 12 by, for example, a countershaft 36, a belt (not shown), an electric circuit (not shown), or in any other suitable manner. Although FIG. 2 illustrates pump 28 as being dedicated to supplying pressurized fluid only to hydraulic cylinder 24, it is contemplated that pump 28 may alternatively supply pressurized fluid to additional hydraulic components of machine 10.

Tank 30 may embody a reservoir configured to hold a supply of fluid. The fluid may include, for example, an engine lubrication oil, a transmission lubrication oil, a separate hydraulic oil, or any other fluid known in the art. Pump 28 may draw fluid from and return fluid to tank 30. It is contemplated that pump 28 may be connected to multiple separate fluid tanks.

Control valve 42 may allow fluidic communication between pump 28 and tank 30. Specifically, control valve 42 may be connected to pump 28 via a supply line 38, and to tank 30 via a drain line 40 to control actuation of hydraulic cylinder 24. Control valve 42 may include at least one valve element that functions to meter pressurized fluid to one of the first and second chambers within hydraulic cylinder 24, and to simultaneously allow fluid from the other of the first and second chambers to drain to tank 30. In one example, control valve 42 may be pilot actuated against a spring bias to move between a first position, at which fluid is allowed to flow into the first chamber while fluid drains from the second chamber to tank 30, a second neutral position, at which fluid flow is blocked from both the first and second chambers, and a third position, at which the flow directions from the first position are reversed. The location of the valve element between the first, second, and third positions may determine a flow rate of the pressurized fluid into and out of the associated first and second chambers and a corresponding actuation velocity. It is contemplated that control valve 42 may alternatively be replaced with multiple independent metering valves that control the filling and draining functions of each of the first and second chambers for each hydraulic cylinder 24 separately. It is further contemplated that control valve 42 may alternatively be electrically actuated, mechanically actuated, pneumatically actuated, or actuated in any other suitable manner.

Operator station 20 may be a location from which the operator controls the operation of machine 10. Operator station 20 may be located on or off machine 10. Operator station 20 may include one or more operator input devices 21, such as an operation mode selector 21*a* and throttle lock selector 21*b*. Operator input devices 21 may be located proximal an operator seat and may or may not be associated with a console. Operator input devices 21 may embody single or multi-axis joysticks, wheels, knobs, push-pull devices, buttons, pedals, switches, and other operator input devices known in the art.

Operation mode selector 21*a* may receive input from an operator, indicative of a desired operation mode. In one embodiment, operation mode selector 21*a* may be a rocker switch with three selectable positions. Each position of the rocker switch may correspond to a given operation mode. In one example, the three modes may be "normal," "economy 1," and "economy 2." The normal mode may allow standard operation of machine 10. Economy 1 and economy 2 modes may provide improved fuel efficiency, exhaust emissions, engine noise and decreased machine harshness through regulation of power source 12 and pump 28.

Throttle lock selector **21*b* may receive input from an operator indicative of a desired throttle setting for power source 12. For example, throttle lock selector 21*b* may embody a switch or a button with an "on" and "off" position. When throttle lock selector 21*b* is on, it may maintain power source 12 at a substantial constant desired speed. This desired speed may be set by the operator before engaging throttle lock selector 21*b*. When throttle lock selector 21*b* is off, the operator may freely modulate the speed of power source 12 via a throttle device (not shown). It is contemplated that throttle lock selector 21*b*** may be adjusted automatically in response to one or more inputs.

A control system 34 may include components that monitor and modify the performance of machine 10 and its components. In particular, control system 34 may include a task sensor 44 and a controller 48 in communication with task sensor 44. Controller 48 may also communicate with power source 12, transmission 16, hydraulic system 22, and operator station 20. Controller 48 may communicate with operation mode selector **21*a* via communication line 50 to detect the user selected operation mode. Controller may also communicate with throttle lock selector 21*b* via communication line 58 to detect the operator selected throttle setting. Controller may regulate the speed of power source 12 and the flow capacity of pump 28 via communication lines 52 and 54**, respectively.

Task sensor 44 may provide information to controller 48 that may be used to classify a current task. For example, task sensor 44 may embody a work implement 32 position or velocity sensor, a machine 10 travel speed sensor, a transmission 16 gear ratio sensor, a power source 12 speed sensor, an operator input sensor associated with control of work implement 32, a pressure sensor associated with pressurized fluid driving work implement 32, and any other sensor associated with the performance, operation, and/or productivity of machine 10. The type and number of sensors used may vary with the application. For example, a position or velocity task sensor may embody a potentiometer, a tachometer, or an optical encoder. A pressure task sensor may embody a piezoelectric transducer, a capacitive sensor, or a strain gauge. The task sensor may also embody any other sensor type known in the art. Task sensor 44 may communicate a task-associated measurement to controller 48 via communication line 56. Controller 48 may use the information from one or more task sensors 44 in any combination to classify a currently performed task.

Controller 48 may embody a single microprocessor or multiple microprocessors that include a means for controlling an operation of machine 10. Numerous commercially available microprocessors can be configured to perform the functions of controller 48, and it should be appreciated that controller 48 could readily embody a general machine microprocessor capable of controlling numerous machine functions. Controller 48 may include a memory, a secondary storage device, a processor, and any other components for running an application. Various other circuits may be associated with controller 48, such as power supply circuitry, signal conditioning circuitry, data acquisition circuitry, signal output circuitry, signal amplification circuitry, and other types of circuitry known in the art.

It is also considered that controller 48 may include one or more maps stored within an internal memory of controller 48. Each of these maps may include a collection of data in the form of tables, graphs, and/or equations. Specifically, these maps may correlate with selectable modes of operation, such as the 1st economy mode, the 2nd economy mode, and the normal mode. Each selectable mode of operation map may include information that may be used to classify specific tasks currently being performed in that mode. These tasks may include, a digging task, a traversing task, an unloading task, and other operator desired tasks. Each mode of operation map may include data that may be used to implement a high power setting, and a low power setting. There may be a different high power setting and low power setting for each mode of operation. The modes of operation may be selected manually by an operator or automatically selected by controller 48.

Each selectable mode of operation may include a predetermined set of conditions and limit values that may be used to classify the current task. The conditions may be satisfied by comparing measured (via task sensors 44) or simulated values to limit values via a predetermined algorithm (e.g., condition may test if limit value is greater than or less than measured value). The limit values may be stored in the memory of controller 48 and/or may be supplied by the operator. The limit values may comprise, for example, a travel speed of machine 10, a minimum and/or maximum allowable speed of power source 12, a current and/or desired gear ratio of transmission 16, a position of work implement 32, and a pressure of the fluid driving work implement 32. The limit values may be used by controller 48 alone or in any combination.

Each selectable mode may also contain setpoint values that controller 48 may use to implement the power source speed and pump flow capacity for the desired operating mode. The setpoint values for a normal mode may be, for example, a desired power source speed in the range of 2100 to 2300 rpm and a desired pump flow capacity of around 250 cc/Rev. The setpoint values for a low power economy 1 mode may be a desired power source speed of around 1800 rpm and a desired pump flow capacity of around 200 cc/Rev. The setpoint values for a low power economy 2 mode may be a desired power source speed of around 1700 rpm and a desired pump flow capacity of around 175 cc/Rev. A high power setting within either economy 1 or economy 2 mode may be associated with an increase in desired power source speed to a range between 2100 and 2300 rpm. A high power setting within either economy 1 or economy 2 mode may be associated with an increase in desired pump flow capacity to around 250 cc/Rev.

In response to an input received via operation mode selector **21*a*, controller 48 may change the operation of machine 10 from one mode of operation to another mode of operation (e.g., from economy 1 to normal mode of operation). Within each mode of operation, controller 48 may also change between a high or low power setting by regulating a specific component or process, such as the speed of power source 12 and/or the flow capacity of pump 28. Controller 48 may regulate the speed of power source 12 by, for example, reducing or increasing an available fuel and/or air inflow (i.e., changing the available potential energy). Modification in the flow capacity of pump 28 may be achieved by, for example, destroking or restroking pump 28. This regulation may allow controller 48 to efficiently respond to a work implement task of machine 10. Controller 48 may use any control algorithm, such as bang-bang control, proportional control, proportional integral derivative control, adaptive control, model-based control, logic-based control, and any other control method known in the art. Controller 48** may use either feedforward or feedback control.

Figure 3:
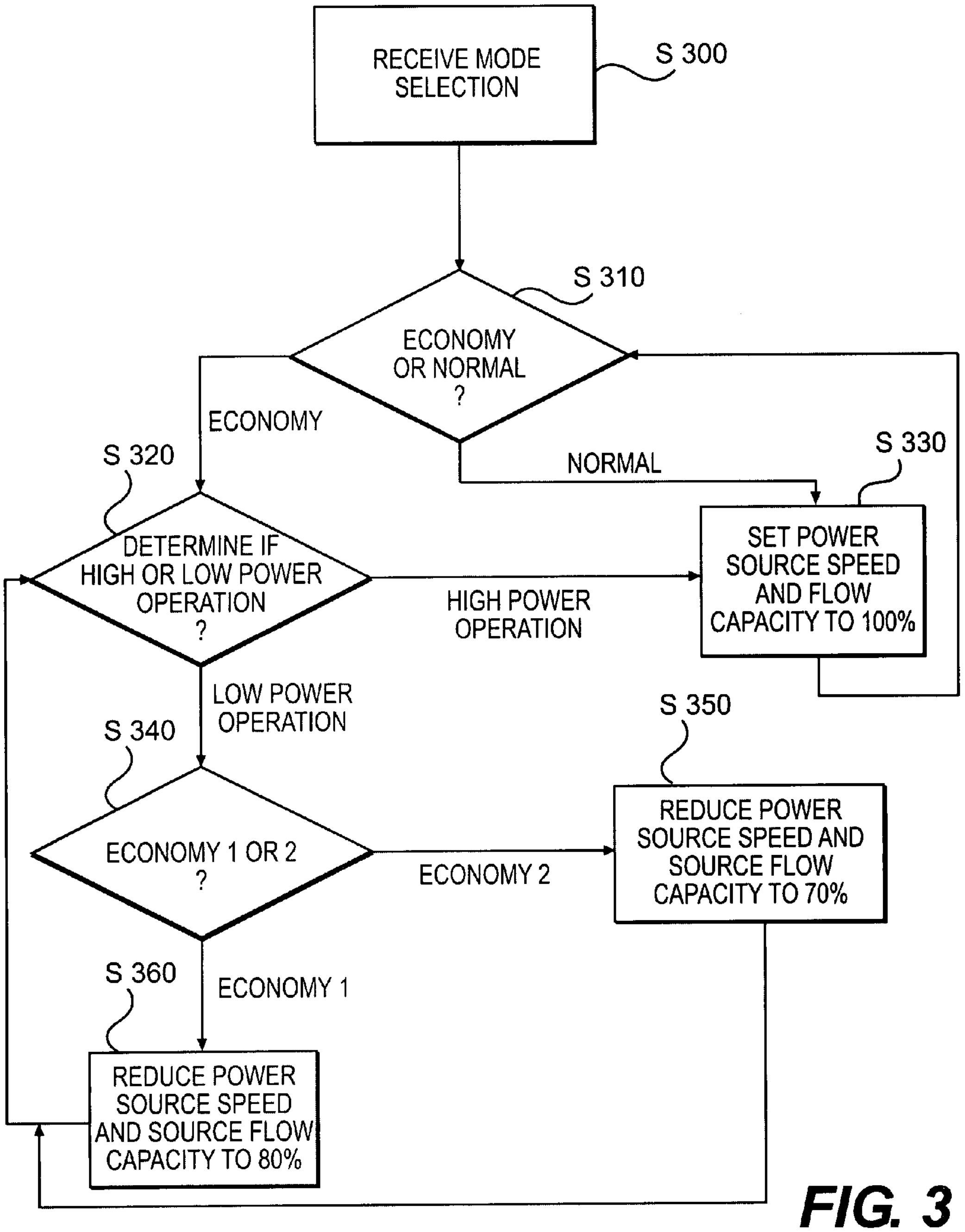
FIG. 3 is a flowchart depicting an exemplary operation of the control system illustrated in FIG. 2.

FIG. 3 outlines an exemplary method of operating machine 10. FIG. 3 will be discussed in detail below.

INDUSTRIAL APPLICABILITY

The disclosed control system may be applicable to any machine where greater control of fuel consumption, machine harshness, exhaust emissions, and engine noise is desired. Particularly, the disclosed control system may provide a plurality of selectable modes of operation, including at least one economy mode, where each mode affects the operation of a power source and/or pressurized fluid source. Further, the disclosed control system may automatically regulate the power source and the pressurized fluid source based on the classification of low and high power tasks. This adjustment according to the current task may provide an overall reduction in fuel consumption, machine harshness, exhaust emissions, and engine noise. The operation of control system 34 will now be described.

As described above, the operator may use operator input device 21*a* to select between several modes, including normal mode, economy 1, and economy 2. Controller 48 may receive the mode selection made by the operator as illustrated in the flowchart of FIG. 3 (step 300). Upon receiving the mode selection, controller 48 may determine which of the available modes has been selected (step 310). If the operator selects the normal mode of operation, controller 48 may set a current speed of power source 12 to its maximum allowable speed, and the flow capacity of pump 28 to its maximum flow capacity (step 330). The operator may select the normal mode for tasks where economy may be sacrificed in return for responsiveness and/or capacity of machine 10. Controller 48 may remain in the normal mode until the operator selects a new mode of operation.

If the operator selects an economy mode of operation, controller 48 may communicate with task sensor 44 to receive data regarding tasks currently being performed by machine 10. Controller 48 may then, according to the disclosed control algorithm, determine if machine 10 requires high power operation or low power operation (step 320).

For example, machine 10 may be a wheel loader performing a loading cycle. This loading cycle may consist essentially of a digging task, an approach to a load vehicle task, an unloading task, and a return back to a digging location task. During this loading cycle, the controller may receive measurements regarding the position and/or angle of work implement 32, the travel velocity of machine 10, the current speed of power source 12, the position of an operator input device used to manipulate work implement 32, and/or the current gear ratio of transmission 16. Controller 48 may reference these measurements with the maps stored in its memory to classify what task or portion of the loading cycle machine 10 is currently performing (e.g., a predetermined position of work implement 32 may be associated with a digging task). Controller 48 may classify a digging task as a high power task, and controller 48 may automatically respond by raising the speed of power source 12 and the flow capacity of pump 28 to, for example, about the same settings as in normal mode (step 330). Controller 48 may maintain these increased settings until the conditions for high power operation are no longer satisfied. Specifically, the switch from high to low power operation may occur when machine 10 ceases its digging task and commences its approach task (i.e., when controller 48 detects and classifies a low power task of the loading cycle).

If, at step 320, controller 48 determines that machine 10 is currently performing a low power task, such as an approaching task or a returning task, controller 48 may then determine if the operator has selected economy 1 mode or economy 2 mode (step 340). If the operator has selected economy 1 mode, controller 48 may set or reduce the speed of power source 12 to around 80% of its maximum allowable speed, and set or reduce the flow capacity of pump 28 to around 80% of its maximum flow capacity (step 360). Controller 48 may maintain this reduction in the speed of power source 12 and the flow capacity of pump 28 until controller 48 detects and classifies conditions that require higher power or until the operator selects another mode of operation. For example, machine 10 may remain in the first economy mode while performing its traversing task en route to its loading task.

If the operator selects economy mode 2, then controller 48 may set or reduce the speed of power source 12 to around 70% of its maximum allowable speed, and set or reduce the flow capacity of pump 28 to around 70% of its maximum flow capacity (step 350). Controller 48 may maintain this reduction in power source speed and pump flow capacity until it detects and classifies tasks that require high power or until the operator selects another mode of operation. While in either economy 1 or economy 2 mode, controller 48 may continuously monitor and classify tasks being performed by machine 10. Controller 48 may increase the temporary speed of power source 12 and flow capacity of pump 28 settings as required (return to step 330).

If the throttle lock selector 21*b* is active during operation of machine 10, in addition to lowering a power source output limit, controller 48 may also actively change current power source speeds and/or pump flow capacities to match the reduced setpoint values. Alternatively, controller 48 may only kick out throttle lock selector 21*b*, requiring the operator to reset and/or override, if desired.

Several advantages of the task-adjusted economy mode system may be realized over the prior art. In particular, the disclosed system may provide a plurality of selectable modes of machine operation and automatically modulate power source speed and pump flow capacity when a task requires high power operation. This combination of selectable economy modes and automatic task adjustments, may provide increased efficiency without added operator input complexity.

It will be apparent to those skilled in the art that various modifications and variations can be made to the disclosed task-adjusted economy mode system without departing from the scope of the invention. Other embodiments of the machine control system will be apparent to those skilled in the art from consideration of the specification and practice of the machine control system disclosed herein. It is intended that the specification and examples be considered as exemplary only, with a true scope being indicated by the following claims and their equivalents.

What is claimed is:

1. A machine control system, comprising:

a power source;

an operator input device configured to allow selection of an economy mode;

a work implement configured to accomplish a task;

a pump driven by the power source to pressurize fluid to move the work implement; and a controller in communication with the power source and the operator input device, the controller being configured to:

determine if the task currently performed by the work implement is a high power task or a low power task; and when the operator input device is set to the economy mode, allow the power source and the pump to operate at full capacity if the currently performed task is a high power task and limit the operation of the power source and the pump if the currently performed task is a low power task.

2. The machine control system of claim 1, wherein operation of the pump is configured to be limited by about the same percentage as operation of the power source.

3. The machine control system of claim 1, further including a task sensor configured to generate a task signal indicative of at least one of a work implement position, machine travel speed, and transmission gear ratio, wherein the controller is in communication with the task sensor and configured to determine the currently performed task based on the task signal.

4. The machine control system of claim 1, wherein: determining if the task currently performed by the work implement is a high power task or a low power task includes determining a position of a work implement.

5. The machine control system of claim 4, wherein:

limiting operation of the power source comprises limiting a maximum speed setting of the power source.

6. The machine control system of claim 5, wherein the controller is configured to limit the speed setting by up to 30%.

7. The machine control system of claim 6, wherein:

the operator input device allows selection of a normal mode of operation, a first economy mode of operation, and a second economy mode of operation;

the controller is configured to limit the speed setting by up to 20% in the first economy mode of operation; and the controller is configured to limit the speed setting by up to 30% in the second economy mode of operation.

8. The machine control system of claim 4, wherein:

the controller includes a plurality of task classifications stored in the memory thereof.

9. The machine control system of claim 8, wherein the high power task includes a digging operation.

10. A method of machine control, comprising:

generating a power output;

pressurizing a fluid;

directing the pressurized fluid to actuate a work implement, the work implement performing a task;

receiving an input indicative of a desired mode of power output generation;

classifying the currently performed task;

adjusting power generation based on the input and the classification;

adjusting a flow rate of the fluid based on the input and the classification;

when the desired mode of operation is the economy mode, adjusting power generation includes:

adjusting power generation to full capacity if the currently performed task is a high power task, and limiting power generation if the currently performed task is a low power task.

11. The method of claim 10, wherein limiting power generation includes limiting power generation by up to 30%.

12. The method of claim 10, wherein:

when the desired mode of operation is the economy mode, adjusting a flow rate of the fluid includes:

adjusting a flow rate of the fluid to full capacity if the currently performed task is a high power task, and limiting the flow rate of the fluid if the currently performed task is a low power task.

13. The method of claim 12, wherein the high power task includes a digging operation.

14. The method of claim 12, wherein the flow rate is adjusted by about the same percentage as the power generation.

15. A machine, comprising:

a traction device;

a work implement;

a power source configured to generate a power output;

a transmission configured to transmit the power output to the traction device;

a pump driven by the power source to pressurize fluid directed to drive the work implement;

an operator input device configured to generate a signal indicative of a desired mode of power source operation; and a controller in communication with the power source, the operator input device, and the pump, wherein the controller includes a plurality of selectable modes of power source operation stored in a memory thereof, the plurality of selectable modes including at least one economy mode of operation, the controller being configured to:

determine if a task currently performed by the machine is a high power task or a low power task; and when the controller is set via the operator input device to the economy mode, allow power source operation and/or pump operation at full capacity if the currently performed task is a high power task and limit the power source operation and pump operation if the currently performed task is a low power task.

16. The machine of claim 15, wherein:

the power source has a maximum speed setting; and the controller is further configured to:

reduce the maximum speed setting by up to 30% when the controller is set to the economy mode of operation.

17. The machine of claim 15, determine if a task currently performed by the machine is a high power task or a low power task includes determining a position of the work implement.

* * * * *